(12) United States Patent
Maruyama et al.

(10) Patent No.: US 8,097,315 B2
(45) Date of Patent: Jan. 17, 2012

(54) MULTILAYER CONTAINER

(75) Inventors: Katsuya Maruyama, Kanagawa (JP);
Kazunobu Maruo, Kanagawa (JP);
Hiroyuki Nanba, Kanagawa (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 830 days.

(21) Appl. No.: 10/837,782

(22) Filed: May 4, 2004

(65) Prior Publication Data
US 2004/0224112 A1    Nov. 11, 2004

(30) Foreign Application Priority Data
May 6, 2003   (JP) ................. 2003-128372

(51) Int. Cl.
*B32B 1/02*    (2006.01)
*B32B 1/04*    (2006.01)
(52) U.S. Cl. ............. 428/35.7; 428/34.1; 428/34.2; 428/35.9; 428/36.9
(58) Field of Classification Search .......... 428/34.1, 428/34.2, 35.7, 35.9, 36.9
See application file for complete search history.

(56) References Cited

U.S. PATENT DOCUMENTS

| | | | |
|---|---|---|---|
| 4,535,901 A | | 8/1985 | Okudaira et al. |
| 5,028,462 A | | 7/1991 | Matlack et al. |
| 5,175,238 A | * | 12/1992 | Matlack et al. ............. 528/339 |
| 6,166,171 A | * | 12/2000 | Yamamoto et al. ............. 528/310 |
| 6,214,269 B1 | * | 4/2001 | Fujita et al. ............. 264/176.1 |
| 6,423,776 B1 | * | 7/2002 | Akkapeddi et al. ............. 525/66 |
| 6,759,108 B1 | | 7/2004 | Ota et al. |
| 6,800,127 B2 | * | 10/2004 | Babler ............. 106/493 |

FOREIGN PATENT DOCUMENTS

| | | |
|---|---|---|
| CN | 1353645 | 6/2002 |
| EP | 0 288 972 | 11/1988 |
| EP | 0 358 038 | 3/1990 |
| EP | 0 409 666 | 1/1991 |
| EP | 0 781 650 | 7/1997 |
| JP | 64-6056 | 1/1989 |
| JP | 6-32979 | 2/1994 |
| JP | 2001-1476 | 1/2001 |
| JP | 2001-354222 | 12/2001 |

OTHER PUBLICATIONS

Chinese Official Action for Application No. 200410036657, dated Sep. 21, 2007.

* cited by examiner

*Primary Examiner* — Marc Patterson
(74) *Attorney, Agent, or Firm* — Antonelli, Terry, Stout & Kraus, LLP.

(57) ABSTRACT

The multilayer container of the present invention comprises an outermost layer, an innermost layer and at least one intermediate layer interposed between the outermost layer and the innermost layer. Each of the outermost and innermost layers is mainly made of a thermoplastic polyester resin A produced by polymerizing a dicarboxylic acid component comprising 80 mol % or higher of terephthalic acid with a diol component comprising 80 mol % or higher of ethylene glycol. At least one of the intermediate layers is mainly made of a mixed resin B of a polyamide resin C and a polyamide resin D in a mixing ratio of 99.5/0.5 to 80/20 by weight. The polyamide resin C is produced by polymerizing a diamine component comprising 70 mol % or higher of m-xylylenediamine with a dicarboxylic acid component comprising 70 mol % or higher of adipic acid. The polyamide resin D has a solubility index satisfying the formula (1):

$$Sa < Sd < Sc \qquad (1)$$

wherein each of Sa, Sb and Sd is a solubility index, calculated by Small method, of the thermoplastic polyester resin A, the polyamide resin C and the polyamide resin D. The polyamide resin D has a glass transition temperature of 130° C. or lower which is higher than that of the polyamide resin C. The multilayer container is excellent in gas-barrier property and resistant to delamination even when its shape includes indented and bending portions, allowing a broad design latitude.

17 Claims, No Drawings

MULTILAYER CONTAINER

BACKGROUND OF THE INVENTION

1. Field of the Invention

The present invention relates to the prevention of delamination of a multilayer container, more particularly, relates to preventing a multilayer container from delamination due to shock during its transportation or impact from a fall by improving the interlaminar bonding between an innermost or outermost layer and an intermediate layer, and further relates to a multilayer container which is capable of avoiding delamination without limiting its shape to a shape having little indented portion and bending portion, thereby broadening the design latitude.

2. Description of the Prior Art

At present, plastic containers (bottles) made mainly of polyesters such as polyethylene terephthalate (PET) have been extensively used as containers for teas, fruit juices, carbonated beverages, etc. Among them, the use of small-size plastic bottles have increased in proportion year by year. In general, as the size of a bottle is reduced, a surface area per unit volume increases, shortening the freshness date of the contents. In recent years, beer susceptible to oxygen and light and hot tea have come to be sold in plastic bottles. With such a recent extension of application field of plastic containers, it is demanded to further enhance the gas-barrier property of plastic containers.

To meet the above demand for enhancing a good gas-barrier property of plastic bottles, there have been developed multilayer bottles made of a thermoplastic polyester resin and a gas-barrier resin, blend bottles, barrier-coated bottles produced by forming a carbon coat, a deposit or a barrier resin coat onto a single layer bottle made of a thermoplastic polyester resin, etc.

The multilayer bottles which have been put into practical use are produced by a biaxially stretching blow-molding of a three- or five-layer parison produced by injecting a thermoplastic polyester resin such as PET for forming innermost and outermost layers and a thermoplastic gas-barrier resin such as poly(m-xylylene adipamide) (polyamide MXD6) into a mold cavity Further, resins having an oxygen-capturing function for capturing oxygen within a container while preventing penetration of oxygen from the outside of the container have been developed and applied to multilayer bottles. As the oxygen-capturing bottle, a multilayer bottle having a gas-barrier layer made of polyamide MXD6 incorporated with a transition metal catalyst is suitably used in view of oxygen-absorbing rate, transparency, moldability, etc.

The above multilayer bottle has been used as containers for beer, tea, carbonated beverages, etc., because of its good gas-barrier property. Although the quality of the contents can be maintained with an improved shelf life by the use of the multilayer bottle in the above application, the delamination between different resin layers, for example, between the innermost or outermost layer and the intermediate layer occurs to reduce the commercial value.

To solve this problem, there has been proposed a method in which a resin for forming the innermost and outermost layers is finally injected into a mold cavity while allowing an amount of the resin to flow back toward the gas-barrier resin by using a back-flow controller, thereby allowing a roughly mixed resin to interpose between the layers to improve the delamination resistance (Japanese Patent Application Laid-Open No. 2000-254963). However, the proposed method requires the use of the special apparatus.

SUMMARY OF THE INVENTION

An object of the present invention is to solve the above problems and provide a multilayer container which is resistant to the delamination due to fall and shock and is not limited in its shape to a shape having little indented portion and bending portion to prevent the delamination, thereby broadening the design latitude.

As the result of extensive studies on the delamination resistance of multilayer containers, the inventors have found that the interlaminar bonding is improved by increasing the affinity between a resin for forming innermost and outermost layers and a resin for forming an intermediate layer and by blending a resin having a higher glass transition temperature, this resulting in the prevention of the delamination due to fall, etc. Namely, the inventors have found that a multilayer container resistant to the delamination is produced by allowing the solubility index of the resin for forming the intermediate layer to approach the solubility index of resin for forming the innermost and outermost layers and by allowing the resin for forming the intermediate layer to become highly strained after blow-molding. The present invention has been accomplished on the basis of these findings.

Thus, the present invention provides a multilayer container comprising an outermost layer, an innermost layer and at least one intermediate layer interposed between the outermost layer and the innermost layer, wherein the outermost layer and the innermost layer are each mainly made of a thermoplastic polyester resin A produced by polymerizing a dicarboxylic acid component comprising 80 mol % or higher of terephthalic acid with a diol component comprising 80 mol % or higher of ethylene glycol;

at least one of the at least one intermediate layer is mainly made of a mixed resin B of a polyamide resin C and a polyamide resin D in a mixing ratio of 99.5/0.5 to 80/20 by weight;

the polyamide resin C being produced by polymerizing a diamine component comprising 70 mol % or higher of m-xylylenediamine with a dicarboxylic acid component comprising 70 mol % or higher of adipic acid;

the polyamide resin D having a solubility index satisfying the formula (1):

$$Sa < Sd < Sc \qquad (1)$$

wherein Sa is a solubility index of the thermoplastic polyester resin A; Sc is a solubility index of the polyamide resin C, and Sd is a solubility index of the polyamide resin D, each solubility index being calculated by Small method; and the polyamide resin D having a glass transition temperature of 130° C. or lower which is higher than that of the polyamide resin C.

The present invention further provides a production method of the multilayer container described above.

DETAILED DESCRIPTION OF THE INVENTION

The thermoplastic polyester resin A (hereinafter referred to as "polyester resin A") for forming the outermost layer and the innermost layer, and optionally forming at least one layer of the intermediate layers is polyester produced by polymerizing a dicarboxylic acid component comprising 80 mol % or higher, preferably 90 mol % or higher of terephthalic acid with a diol component comprising 80 mol % or higher, preferably 90 mol % or higher of ethylene glycol.

The polyester resin A is preferably polyethylene terephthalate because of its excellence in all of transparency, mechanical strength, injection moldability and stretch blow moldability.

Examples of dicarboxylic acids other than terephthalic acid include isophthalic acid, diphenyl ether-4,4-dicarboxylic acid, naphthalene-1,4- or -2,6-dicarboxylic acid, adipic acid, sebacic acid, decan-1,10-dicarboxylic acid, and hexahydroterephthalic acid. Examples of diols other than ethylene glycol include propylene glycol, 1,4-butanediol, neopentyl glycol, diethylene glycol, cyclohexane dimethanol, 2,2-bis(4-hydroxyphenyl)propane, and 2,2-bis(4-hydroxyethoxyphenyl)propane. Further, oxy acids such as p-oxybenzoic acid may also be used as a raw monomer of the polyester resin A.

The polyester resin A has an intrinsic viscosity of 0.55 to 1.50 dl/g and preferably 0.65 to 1.40 dl/g. An intrinsic viscosity of 0.55 dl/g or higher enables the production of a transparent and amorphous multilayer parison having a satisfactory mechanical strength. By regulating the intrinsic viscosity to 1.50 dl/g or lower, the molding troubles due to viscosity increase can be avoided.

Further, the polyester resin A may also contain another thermoplastic resin unless adversely affecting the effects of the present invention. Examples of another thermoplastic resin include thermoplastic polyester resins such as polyethylene-2,6-naphthalenedicarboxylate, polyolefin resins, polycarbonates, polyacrylonitrile, polyvinyl chloride, and polystyrene. The blending amount of another thermoplastic resin is preferably 10% by weight or less of the polyester resin A.

At least one of the intermediate layers of the multilayer container of the present invention is formed from the mixed resin B comprising the polyamide resin C and the polyamide resin D.

The polyamide resin C is produced by the polymerization of a diamine component comprising 70 mol % or higher of m-xylylenediamine and a dicarboxylic acid component comprising 70 mol % or higher of adipic acid. When the content of m-xylylenediamine in the diamine component is 70 mol % or higher, an excellent gas-barrier property can be maintained. When the content of adipic acid in the dicarboxylic acid component is 70 mol % or higher, the lowering of the gas-barrier property and crystallizability can be prevented.

The polyamide resin C is preferably poly(m-xylylene adipamide) (polyamide MXD6) because of its excellence in co-injection moldability and co-stretch blow-moldability with the polyester resin A (polyethylene terephthalate).

Examples of diamines other than m-xylylenediamine include, but are not limited to, aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin and bis(aminomethyl)tricyclodecane; and aromatic ring-containing diamines such as bis(4-aminophenyl) ether, p-phenylenediamine, p-xylylenediamine and bis(aminomethyl)naphthalene.

Examples of the dicarboxylic acids other than adipic acid include, but are not limited to, suberic acid, azelaic acid, sebacic acid, 1,10-decanedicarboxylic acid, terephthalic acid, isophthalic acid, and 2,6-naphthalenedicarboxylic acid. In addition, a small amount of a molecular weight modifier such as monoamines and monocarboxylic acids may be added during the production of the polyamide resin C.

The polyamide resin C is produced by melt-polycondensing the diamine component with the dicarboxylic acid with or without a subsequent solid-phase polymerization.

The melt polycondensation is conducted, for example, by heating a nylon salt of m-xylylenediamine and adipic acid under pressure in the presence of water to proceed the melt-polymerization while removing water added and water eliminated by the condensation. Alternatively, the melt polycondensation may be carried out by directly adding m-xylylenediamine into a molten adipic acid. In this method, to maintain a uniform and liquid condition of the reaction system, m-xylylenediamine is continuously added while heating the reaction system to prevent the reaction temperatures from becoming lower than the melting points of oligoamides and polyamides being produced.

The relatively low-molecular weight polyamide produced by the melt polycondensation usually has a relative viscosity of about 2.28 when measured at 25° C. on a solution of one gram of the polyamide resin in 100 ml of a 96% sulfuric acid. By controlling the relative viscosity after the melt polycondensation to 2.28 or lower, a high-quality polyamide with little gelled substances and a good color tone can be obtained. The relatively low-molecular weight polyamide produced by the melt polycondensation may be further subjected to solid-phase polymerization.

The solid-phase polymerization is carried out by heating a pelletized or powdered relatively low-molecular weight polyamide produced by the melt polycondensation at 150° C. or higher but not more than the melting point of the polyamide under reduced pressure or in an inert gas atmosphere. The relative viscosity of the solid-phase polymerized polyamide is preferably 2.3 to 4.2. When the relative viscosity is in the above range, the moldability into hollow containers, films and sheets is good, and the resultant hollow containers, films and sheets are excellent in properties, particularly, in mechanical properties. The relatively low-molecular weight polyamide produced by the melt polycondensation partially attains the effects of the present invention, but somewhat insufficient in mechanical properties, particularly in impact resistance, thus less practical as the raw material for hollow containers.

The polyamide resin D satisfies the following formula (1):

$$Sa < Sd < Sc \tag{1}$$

wherein Sa is a solubility index of the thermoplastic polyester resin A, Sc is a solubility index of the polyamide resin C and Sd is a solubility index of the polyamide resin D.

The solubility index is calculated by Small Method ("Journal of Japan Adhesion Society", Vol. 22, No. 10, p. 51 (1986)).

It is important for the polyamide resin D to have Sd between Sa and Sc to enhance the affinity between the intermediate layer (gas-barrier layer) with each of the innermost and outermost layers (polyester resin A layers) Sd outside the above range is unfavorable for preventing the delamination, because the affinity between the mixed resin B for the intermediate layer and the polyester resin A for the innermost and outermost layers becomes low to reduce the interlaminar bonding.

The polyamide resin D having such properties can be obtained by suitably design the backbone segment of polymer so as to satisfy the formula (1) while taking the solubility indices of the polyester resin A and the polyamide resin C calculated by Small Method into account.

The glass transition temperature of the polyamide resin D is higher than that of the polyamide resin C and 130° C. or lower. If the glass transition temperature of the polyamide resin D is higher than that of the polyamide resin C, the polyamide resin D forming the intermediate layer is largely strained by stress after blow-molding. It is considered that the function of relaxing the strain enhances the delamination resistance. If the glass transition temperature of the polyamide resin D exceeds 130° C., although the effect of preventing the delamination is found, the molding into multilayer containers unfavorably becomes difficult.

In the present invention, as mentioned above, polyethylene terephthalate is preferably used as the polyester resin A because of its excellence in transparency, mechanical strength, injection-moldability and stretch blow-moldability. Also, polyamide MXD6 is preferably used as the polyamide resin C because of its excellence in co-moldability by injection molding and by stretch blow molding with polyethylene terephthalate. When polyethylene terephthalate is selected as the polyester resin A and polyamide MXD6 is selected as the polyamide resin C, polyamide resins having a solubility index of 11 to 13, preferably 12.0 to 12.9 such as nylon 6IT and nylon 6I6T (I means isophthalic acid and T means terephthalic acid) are preferably used as the polyamide resin D, with nylon 6IT being particularly preferably used.

The mixed resin B is prepared by a dry blend method in which pellets of the polyamide resin C and the polyamide resin D are dry-blended in a hopper and then made into pellets again by an injection molding machine, or a melt blend method in which the polyamide resin C and the polyamide resin D are melt-extruded and made into pellets again. The blending formulation may be appropriately changed according to applications, conditions of use, mechanical properties, etc.

The weight ratio of the polyamide resin C and the polyamide resin D in the mixed resin B is 99.5/0.5 to 80/20, preferably 99/1 to 85/15 and more preferably 95/5 to 90/10. When the proportion of the polyamide resin D is less than 0.5% by weight, a remarkable improvement in the delamination resistance is not obtained. A proportion of the polyamide resin D exceeding 20% by weight is not practical, because a good gas-barrier property of the polyamide resin D does not contribute to the resultant multilayer container, although the effect of improving the delamination resistance is found.

The mixed resin B may contain phyllosilicates such as dioctahedral or trioctahedral type phyllosilicates having an electric charge density of 0.25 to 0.6. Examples of the dioctahedral type phyllosilicates include montmorillonite and beidellite. Examples of the trioctahedral type phyllosilicates include hectorite aromatic dinitrile and saponite. Of these phyllosilicates, preferred is montmorillonite.

Before use, the phyllosilicates are preferably contacted with an organic swelling agent such as high-molecular compounds and organic compounds to spread the interlaminar spacing. The organic swelling agent is preferably selected from quaternary ammonium salts (generally halide such as chloride and bromide) and more preferably quaternary ammonium salts containing at least one alkyl or alkenyl group having 12 or more carbon atoms.

Examples of the organic swelling agent include trimethylalkylammonium salts such as trimethyldodecylammonium salts, trimethyltetradecylammonium salts, trimethylhexadecylammonium salts, trimethyloctadecylammonium salts and trimethyleicosylammonium salts; trimethylalkenylammonium salts such as trimethyloctadecenylammonium salts and trimethyloctadecadienylammonium salts; triethylalkylammonium salts such as triethyldodecylammonium salts, triethyltetradecylammonium salts, triethylhexadecylammonium salts and triethyloctadecylammonium salts; tributylalkylammonium salts such as tributyldodecylammonium salts, tributyltetradecylammonium salts, tributylhexadecylammonium salts and tributyloctadecylammonium salts; dimethyldialkylammonium salts such as dimethyldidodecylammonium salts, dimethylditetradecylammonium salts, dimethyldihexadecylammonium salts, dimethyldioctadecylammonium salts and dimethylditallowammonium salts; dimethyldialkenylammonium salts such as dimethyldioctadecenylammonium salts and dimethyldioctadecadienylammonium salts; diethyldialkylammonium salts such as diethyldidodecylammonium salts, diethylditetradecylammonium salts, diethyldihexadecylammonium salts and diethyldioctadecylammonium salts; dibutyldialkylammonium salts such as dibutyldidodecylammonium salts, dibutylditetradecylammonium salts, dibutyldihexadecylammonium salts and dibutyldioctadecylammonium salts; methylbenzyldialkylammonium salts such as methylbenzyldihexadecylammonium salts; dibenzyldialkylammonium salts such as dibenzyldihexadecylammonium salts; trialkylmethylammonium salts such as tridodecylmethylammonium salts, tritetradecylmethylammonium salts and trioctadecylmethylammonium salts; trialkylethylammonium salts such as tridodecylethylammonium salts; trialkylbutylammonium salts such as tridodecylbutylammonium salts; and ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid and 18-aminooctadecanoic acid. In addition, ammonium salts having a hydroxyl group and/or ether group may also be used as the organic swelling agent. Examples thereof include methyl dihydroxyethyl hydrogenated tallow ammonium salts and quaternary ammonium salts containing at least one alkylene glycol residue such as methyldialkyl(PAG)ammonium salts, ethyldialkyl(PAG)ammonium salts, butyldialkyl(PAG)ammonium salts, dimethylbis(PAG)ammonium salts, diethylbis(PAG)ammonium salts, dibutylbis(PAG)ammonium salts, methylalkylbis(PAG)ammonium salts, ethylalkylbis(PAG)ammonium salts, butylalkylbis(PAG)ammonium salts, methyltri(PAG)ammonium salts, ethyltri(PAG)ammonium salts, butyltri(PAG)ammonium salts and tetra(PAG)ammonium salts wherein the "alkyl" represents an alkyl group having 12 or more carbon atoms such as dodecyl, tetradecyl, hexadecyl, octadecyl and eicosyl; and PAG represents a polyalkylene glycol residue, preferably a polyethylene glycol residue or a polypropylene glycol residue having 20 or less carbon atoms. Of these organic swelling agents, preferred are trimethyldodecylammonium salts, trimethyltetradecylammonium salts, trimethylhexadecylammonium salts, trimethyloctadecylammonium salts, dimethyldidodecylammonium salts, dimethylditetradecylammonium salts, dimethyldihexadecylammonium salts, dimethyldioctadecylammonium salts, dimethylditallowammonium salts and methyl dihydroxyethyl hydrogenated tallow ammonium salts. These organic swelling agents may be used alone or in combination of two or more.

The blending amount of the phyllosilicates treated with the organic swelling agent in the mixed resin B is preferably 0.5 to 8% by weight and more preferably 1.5 to 5% by weight of the total weight of the polyamide resin C and the polyamide resin D When the blending amount is within the above range, the gas-barrier property to carbon dioxide gas, oxygen, etc. is improved without losing transparency.

The phyllosilicates treated with the organic swelling agent are preferably uniformly dispersed throughout the mixed resin B without locally forming agglomerates. The uniform dispersion referred to herein means that the layers of phyllosilicate in the mixed resin B is separated into flat plates, 50% or more of which are spaced at an interlaminar spacing of 5 nm or more. The interlaminar spacing means a distance between the gravity centers of flat plates. The larger the interlaminar spacing, the phyllosilicates are dispersed more uniformly to give the final products having a good appearance such as transparency and an improved barrier property to gaseous substances such as oxygen and carbon dioxide gas.

The phyllosilicates treated with the organic swelling agent are dispersed in the mixed resin B by known methods, for example but not limited to, by a method in which the phyllosilicates treated with the organic swelling agent are added under stirring during the melt-polymerization for producing the polyamide resin C and/or the polyamide resin D, a method in which the phyllosilicates treated with the organic swelling agent and the polyamide resin C and/or the polyamide resin D are melt-kneaded in various general extruders such as single-screw or twin-screw extruders, etc., with the melt-kneading method using a twin-screw extruder being preferred in the present invention.

The melt-kneading using a twin-screw extruder is preferably conducted by setting the melt-kneading temperature to a range from about the melting point of the polyamide resins to the melting point +60° C. and by making the residence time of the polyamide resins in the extruder as short as possible. To facilitate the dispersion, it is preferred to use an extruder screw having a zone for mixing the polyamide resins and the phyllosilicates treated with the organic swelling agent, which is formed by a combination of members such as reverse flighted screw element and kneading disk.

In the melt-kneading method, if the polyamide resin C or D has an excessively low melt viscosity, the phyllosilicates fail to be well dispersed in the polyamide resins and come to be easily agglomerated to detract from the appearance of the molded articles. In contrast, if the melt viscosity is excessively high, a special apparatus is needed for the melt-kneading. By suitably controlling the melt viscosity, for example, 200 to 1000 Pa•s for the polyamide resin C and 100 to 900 Pa•s for the polyamide resin D, an adequate pressure is applied to the resins during the extrusion kneading, thereby improving the dispersibility of the phyllosilicates and facilitating the injection molding and extrusion.

The water content of both the polyamide resin C and polyamide resin D is preferably less than 0.2%. When 0.2% or more, the dispersibility of the phyllosilicates treated with the organic swelling agent during the melt-kneading is lowered, and in addition, the molecular weights of the polyamide resins are considerably lowered and gelled substances are likely to be formed in the resultant molded articles.

The mixed resin B may contain at least one metal element selected from the group consisting of transition metals in group VIII of the periodic table, manganese, copper and zinc. These metal elements promote the oxidation of the mixed resin B to develop the oxygen-absorbing function.

The metal element is preferably incorporated into the polyamide resin C and the polyamide resin D as an inorganic salt, an organic salt or a complex salt of its lower oxidation number form (hereinafter referred to as "metal catalyst compound"). Examples of the inorganic salt include halides such as chlorides and bromides, sulfates, nitrates, phosphates and silicates. Examples of the organic salt include carboxylates, sulfonates and phosphates. Examples of the complexes include transition metal complexes with β-diketone or esters of β-keto acid. Because of a good oxygen-absorbing function, carboxylates, halides and acetylacetonato complexes of the above metal elements are preferably used. More preferred are stearates, acetates and acetylacetonato complexes. Of the metal elements, cobalt is preferred because of its excellent oxygen-absorbing function. The metal catalyst compound may be used alone or in combination of two or more.

The amount of the metal element to be added is preferably 0.01 to 0.10% by weight and more preferably 0.02 to 0.08% by weight based on the total weight of the polyamide resin C and the polyamide resin D. If less than 0.01% by weight, the oxygen-absorbing function is insufficient to lessen the effect of improving the oxygen-barrier property of the multilayer container. An amount exceeding 0.10% by weight produces no additional effect of improving the oxygen-barrier property of the multilayer container, thus being poor economy.

A low stretch portion (1 to 2.5 times of stretch ratio) is formed in the multilayer container of the present invention according to the shape of parison or container. The intermediate layer at the low stretch portion sometimes becomes blushed or whitened upon a water absorption. By adding, if needed, a blush inhibitor (whitening inhibitor) to the mixed resin B, the blushing or whitening is prevented to allow the production of a multilayer container with good transparency.

The blush inhibitor usable in the present invention includes metal salts of $C_{18}$ to $C_{50}$, preferably $C_{18}$ to $C_{34}$ aliphatic acids. The blush inhibition is expected when the carbon number is 18 or more. When the carbon number is 50 or less, the dispersion of the blush inhibitor in the mixed resin B becomes uniform. The aliphatic acids may be branched or may have a double bond. Preferred are stearic acid (C18), eicosanoic acid (C20), behenic acid (C22), montanic acid (C28) and triacontanoic acid (C30). Examples of the metals to form the salts with the aliphatic acids include, but are not limited to, sodium, potassium, lithium, calcium, barium, magnesium, strontium, aluminum and zinc, with sodium, potassium, lithium, calcium, aluminum and zinc being particularly preferred.

The aliphatic acid metal salts may be used singly or in combination of two or more. Although not specifically limited to, the particle size of the metal salt of aliphatic acid is preferably 0.2 mm or smaller, because smaller particles are easy to be uniformly dispersed in the mixed resin B.

The addition amount of the metal salt of aliphatic acid is 0.005 to 1.0 part by weight, more preferably 0.05 to 0.5 part by weight and particularly preferably 0.12 to 0.5 part by weight based on 100 parts by weight of the total of the polyamide resin C and the polyamide resin D. When the addition amount is 0.005 part by weight or higher based on 100 parts by weight of the polyamide resins, the effect of inhibiting the blushing is expected. When the addition amount is 1.0 part by weight or lower based on 100 parts by weight of the polyamide resins, the haze of the resultant multilayer containers can be made low.

In place of the metal salt of aliphatic acid, a diamide compound and a diester compound may be added as the blush inhibitor. One or more of the diamide compounds, or one or more of the diester compounds may be added. Alternatively, one or more of the diamide compounds may be added in combination with one or more of the diester compounds.

The diamide compounds are produced by the reaction of a $C_8$ to $C_{30}$ aliphatic acid and a $C_2$ to $C_{10}$ diamine. The effect of inhibiting the blushing is expected when the carbon number is 8 or more for the aliphatic acid and 2 or more for the diamine. The dispersion in the mixed resin B becomes uniform when the carbon number is 30 or less for the aliphatic acid and 10 or less for the diamine. The aliphatic acids may be branched or may have a double bond. Preferred are straight-chain saturated aliphatic acids.

Examples of the aliphatic acid component of the diamide compounds include stearic acid (C18), eicosanoic acid (C20), behenic acid (C22), montanic acid (C28) and triacontanoic acid (C30). Examples of the diamine component of the diamide compounds include ethylenediamine, butylenediamine, hexanediamine, xylylenediamine and bis(aminomethyl)cyclohexane. The diamide compounds produced by combining the above components are used in the present invention. Preferred diamide compounds are those produced from a $C_8$ to $C_{30}$ aliphatic acid and a diamine component mainly comprising ethylenediamine, and those produced from an aliphatic acid component mainly comprising montanic acid and a $C_2$ to $C_{10}$ diamine.

The diester compounds are produced by the reaction of a $C_8$ to $C_{30}$ aliphatic acid and a $C_2$ to $C_{10}$ diol. The effect of inhibiting the blushing is expected when the carbon number is 8 or more for the aliphatic acid and 2 or more for the diol. The dispersion in the mixed resin B becomes uniform when the carbon number is 30 or less for the aliphatic acid and 10 or less for the diol. The aliphatic acids may be branched or may have a double bond. Preferred are straight-chain saturated aliphatic acids.

Examples of the aliphatic acid component of the diester compounds include stearic acid (C18), eicosanoic acid (C20), behenic acid (C22), montanic acid (C28) and triacontanoic acid (C30). Examples of the diol component of the diester compounds include ethylene glycol, propanediol, butanediol, hexanediol, xylylene glycol and cyclohexanedimethanol. The diester compounds produced by combining the above components are used in the present invention. Particularly preferred diester compounds are those produced from an aliphatic acid component mainly comprising montanic acid and a diol component mainly comprising ethylene glycol and/or 1,3-butanediol.

The amount of the diamide compound and/or diester compound to be added is preferably 0.005 to 1.0 part by weight, more preferably 0.05 to 0.5 part by weight and particularly preferably 0.12 to 0.5 part by weight based on 100 parts by weight of the total of the polyamide resin C and the polyamide resin D. When the addition amount is 0.005 part by weight or higher based on 100 parts by weight of the polyamide resins, the effect of inhibiting the blushing is expected. When the addition amount is 1.0 part by weight or lower based on 100 parts by weight of the polyamide resins, the haze of the resultant multilayer containers can be made low.

The blush inhibitor may be mixed with the mixed resin B by conventionally known methods. For example, pellets of the polyamide resin C and the polyamide resin D, the metal catalyst compound and the blush inhibitor are charged into a rotary hollow container and mixed together therein. Also usable are a method in which a polyamide resin composition containing a high concentration of the blush inhibitor is diluted to an intended concentration by melt-kneading with pellets of a polyamide resin containing no blush inhibitor, and a method in which the melt-kneaded product is molded by injection molding, etc.

By the use of the blush inhibitor, the blushing of the intermediate layer made of the mixed resin B immediately after the production of the multilayer container can be prevented. In addition, after a long-term storage of the multilayer container under conditions that the blushing is not caused or not promoted even when the blush inhibitor is not used, the blushing of the intermediate layer made of the mixed resin B can be prevented. Namely, after a long-term storage under conditions that the blushing is not caused or not promoted even when the blush inhibitor is not used, fore example, after a long-term storage in an atmosphere of 23° C. and 50% RH, the blushing is prevented similarly to immediately after the molding even when the stored multilayer container is exposed to a high humidity atmosphere, contacted with water or boiling water, or heated to temperatures higher than the glass transition temperature.

The multilayer container of the present invention is produced by biaxially stretching blow-molding of a multilayer parison which is produced by injecting the polyester resin A and the gas-barrier mixed resin B into a mold cavity respectively from a skin-side injection cylinder and a core-side injection cylinder of a twin-cylinder injection machine through a mold hot runner. The blow-molding of the multilayer parison into containers is carried out in a known manner, for example, by a method in which the multilayer parison is blow-molded after heating the surface to 80 to 120° C., and a method in which the multilayer parison is blow-molded in a mold at 90 to 150° C. after crystallizing its opening end and heating its surface to 80 to 120° C. The blow pressure is generally 2 to 4 MPa.

In the process of injecting the polyester resin A for the innermost and outermost layers from the skin-side injection cylinder and injecting the mixed resin B for the intermediate layer from the core-side injection cylinder, a three-layer parison (polyester resin A/mixed resin B/polyester resin A) is produced by injecting the polyester resin A first, then the mixed resin B simultaneously with the polyester resin A, and finally a necessary amount of the polyester resin A to fill the mold cavity.

In the process of injecting the polyester resin A for the innermost and outermost layers from the skin-side injection cylinder and injecting the mixed resin B for the intermediate layer from the core-side injection cylinder, a five-layer parison (polyester resin A/mixed resin B/polyester resin A/mixed resin B/polyester resin A) is produced by injecting the polyester resin A first, then the mixed resin B alone, and finally the polyester resin A to fill the mold cavity. The process for producing the multilayer parison is not limited to the above methods.

In the multilayer container, the thickness of the layer made of the polyester resin A is preferably 0.01 to 1.0 mm, and the thickness of the layer made of the mixed resin B is preferably 0.005 to 0.2 mm. The wall thickness is not necessarily constant throughout the multilayer container, and may vary within the range of 0.2 to 1.0 mm.

In the multilayer container produced by the biaxially stretching blow-molding of the multilayer parison, it is sufficient for exhibiting the gas-barrier property that the intermediate layer made of the mixed resin B is present at least in a barrel portion of the multilayer container. To obtain a better gas-barrier property, it is preferred to allow the intermediate layer to extend nearer to the opening end of the multilayer container.

In the multilayer container of the present invention, the proportion of the intermediate layer made of the mixed resin B is preferably 1 to 20% by weight and more preferably 2 to 15% by weight based on the total weight of the multilayer container. When less than 1% by weight, the resultant multilayer container tends to be insufficient in gas-barrier property. When exceeding 20% by weight, it may become difficult to mold the multilayer parison as precursor into the multilayer container.

The multilayer container of the present invention is resistant to the delamination due to fall and impact even when made into a shape having indented portion and bending portion. Therefore, the multilayer container is not limited to a shape with little indented portion and bending portion to broaden the design latitude. The multi-layer container of the present invention is suitable for storing and preserving various products including, for example, liquid beverages such as carbonated beverage, juice, water, milk, Japanese sake, whisky, Japanese shochu, coffee, tea, jelly beverage and healthy beverage; seasonings such as liquid seasoning, sauce, soy sauce, salad dressing and liquid soup stock; liquid processed foodstuffs such as liquid soup; and other liquid products such as drug, beauty wash, milky lotion, hair dressing, hair dye and shampoo.

The present invention will be described in more detail with reference to the following examples and comparative examples. However, these examples are only illustrative and not intended to limit the scope of the invention thereto.

In the following examples and comparative examples, the properties were measured and evaluated by the following methods.

(1) Intrinsic Viscosity [η] of Polyethylene Terephthalate

Measured at 30° C. on a solution in a mixed solvent of phenol/tetrachloroethane=6/4 by weight.

(2) Relative Viscosity ($\eta_{rel}$) of Polyamide MXD6

Measured at 25° C. on a solution of one gram of polyamide resin in 100 ml of 96% sulfuric acid.

(3) Solubility Index

Calculated by Small Method ("Journal of Japan Adhesion Society", Vol. 22, No. 10, p. 51 (1986)).

(4) Glass Transition Temperature

Measured at a temperature rise rate of 10° C./min using a heat flux differential scanning calorimeter (Model "DSC-50") available from Shimadzu Corporation.

(5) Haze

Measured according to JIS K-7105 (ASTM D-1003) using a haze measuring apparatus (Model "COH-300A") available from Nippon Denshoku Industries Co., Ltd.

(6) Delamination

Evaluated by a falling test.

Method of Falling Test

A test multilayer container was filled with water, capped, and allowed to stand for 24 h. Then, the multilayer container was allowed to vertically fall from a height of 75 cm to the floor with the bottom foremost. The occurrence of delamination was visually observed. The delamination was evaluated by the number of delaminated bottles in 50 tested bottles.

(7) Oxygen Permeability of Multilayer Container

Measured at 23° C. according to ASTM D3985 under a relative humidity of 100% inside the multilayer container and 50% in the surrounding atmosphere using "OX-TRAN 10/50A" available from Modern Controls Corp.

The multilayer containers used in Examples 1-5 and Comparative Examples 1-2 were produced as follows.

Shape of Three-Layer Parison 95 mm overall length, 22 mm outer diameter, 4.2 mm wall thickness.

The three-layer parison was produced using an injection molding machine (Model "M200"; four-shot molding type) available from Meiki Co., Ltd. Molding Conditions of Three-layer Parison

| | |
|---|---|
| Skin-side injection cylinder temperature: | 280° C. |
| Core-side injection cylinder temperature: | 260° C. |
| Mold runner temperature: | 280° C. |
| Mold cooling water temperature: | 15° C. |
| Proportion of mixed resin B in parison: | 8% by weight |

Shape of Multilayer Container 223 mm overall length, 65 mm outer diameter, 500 ml capacity.

(polyamide)polyester resin A/mixed resin B/(polyamide) polyester resin A=0.28 mm/0.056 mm/0.10 mm bottom shape: champagne bottle shape The biaxially stretching blow-molding was performed using a blow molding machine (Model "LB-01") available from Krupp Corpoplast Inc.

Conditions of Biaxially Stretching Blow Molding

| | |
|---|---|
| Parison heating temperature: | 100° C. |
| Blow pressure: | 2.7 MPa |

EXAMPLE 1

A three-layer container was produced from the following materials. Innermost and Outermost Layer Polyester Resin A: polyethylene terephthalate having an intrinsic viscosity of 0.75 dl/g and a solubility index of 11.1 ("RT543C" available from Nippon Unipet Co., ltd.)

Intermediate Layer

Dry blend of polyamide resin C and polyamide resin D in a weight ratio of 90/10.

Polyamide resin C: Polyamide MXD6 having a relative viscosity of 2.70, a solubility index of 13.0 and a glass transition temperature of 80° C. ("MX Nylon #6007" available from Mitsubishi Gas Chemical Company, Inc.).

Polyamide resin D: Nylon 6IT having a solubility index of 12.6 and a glass transition temperature of 125° C. ("Selar PA 3426" available from Du Pont-Mitsui Polychemicals Co., Ltd.).

The results of evaluation of the delamination are shown in Table 1.

EXAMPLE 2

In the same manner as in Example 1 except for changing the mixing ratio of the polyamide resin C and the polyamide resin D to 95/5, a three-layer container was produced. The results of evaluation of the three-layer container for the delamination are shown in Table 1.

EXAMPLE 3

In the same manner as in Example 1 except for changing the mixing ratio of the polyamide resin C and the polyamide resin D to 99/1, a three-layer container was produced. The results of evaluation of the three-layer container for the delamination are shown in Table 1.

Comparative Example 1

In the same manner as in Example 1 except for constituting the intermediate layer only from the polyamide resin C without using the polyamide resin D, a three-layer container was produced. The results of evaluation of the three-layer container for the delamination are shown in Table 1.

TABLE 1

| | Examples | | | Com. Ex. |
|---|---|---|---|---|
| | 1 | 2 | 3 | 1 |
| Resin | | | | |
| polyester resin A | PET* | PET* | PET* | PET* |
| polyamide resin C | MXD6* | MXD6* | MXD6* | MXD6* |
| polyamide resin D | 6IT* | 6IT* | 6IT* | — |
| mixed resin B* (weight ratio) | 90/10 | 95/5 | 99/1 | 100/0 |
| Solubility index | | | | |
| Sa | 11.1 | 11.1 | 11.1 | 11.1 |
| Sc | 13.0 | 13.0 | 13.0 | 13.0 |
| Sd | 12.6 | 12.6 | 12.6 | — |
| Glass transition temperature (° C.) | | | | |
| polyamide resin C | 80 | 80 | 80 | 80 |
| polyamide resin D | 125 | 125 | 125 | — |
| Falling test | | | | |
| number of containers tested | 50 | 50 | 50 | 50 |
| number of delaminated containers | 3 | 7 | 9 | 17 |
| delamination rate (%) | 6 | 14 | 18 | 34 |

Mixed resin B*: polyamide resin C/polyamide resin D
PET*: polyethylene terephthalate
MXD6*: polyamide MXD6
6IT*: nylon 6IT

TABLE 2

| | Examples | | Com. Ex. |
|---|---|---|---|
| | 4 | 5 | 2 |
| Resin | | | |
| polyester resin A | PET* | PET* | PET* |
| polyamide resin C | MXD6* | MXD6* | MXD6* |
| polyamide resin D | 6IT* | 6IT* | — |
| mixed resin B* (weight ratio) | 95/5 | 95/5 | 100/0 |
| Solubility index | | | |
| Sa | 11.1 | 11.1 | 11.1 |
| Sc | 13.0 | 13.0 | 13.0 |
| Sd | 12.6 | 12.6 | — |
| Glass transition temperature (° C.) | | | |
| polyamide resin C | 80 | 80 | 80 |
| polyamide resin D | 125 | 125 | — |
| Content of additives (%) | | | |
| phyllosilicate | 3 | — | — |
| cobalt | — | 0.05 | — |
| Falling test | | | |
| number of containers tested | 50 | 50 | 50 |
| number of delaminated containers | 8 | 6 | 17 |
| delamination rate (%) | 16 | 12 | 34 |
| Gas-barrier property | | | |
| oxygen permeabiity* | 0.0070 | 0.0020 | 0.013 |

Mixed resin B*: polyamide resin C/polyamide resin D
PET*: polyethylene terephthalate
MXD6*: polyamide MXD6
6IT*: nylon 6IT
Oxygen permeabiity*: ml/bottle · day · 0.21 MPa

EXAMPLE 4

Polyamide MXD6 having a relative viscosity of 2.70 ("MX Nylon #6007" available from Mitsubishi Gas Chemical Company, Inc.) and a phyllosilicate treated with an organic swelling agent ("Kumipia" available from Kunimine Industries Co., Ltd.; phyllosilicate containing 30% by weight of octadecyl ammonium as the organic swelling agent) were dry-blended in a weight ratio of 97/3. Into a co-rotating twin-screw extruder of 20 mm cylinder diameter equipped with screws having dwelling zones formed by reverse flighted elements, the resultant mixture was fed at a rate of 6 kg/h. The mixture was melt-kneaded at a cylinder temperature of 270° C., extruded into strands through an extruder head, cooled and pelletized. In the same manner as in Example 1 except for using the obtained pellets as the polyamide resin C, a three-layer container was produced. The results of evaluation of the three-layer container for the oxygen permeability and the delamination are shown in Table 2.

EXAMPLE 5

A dry blend of polyamide MXD6 having a relative viscosity of 2.70 ("MX Nylon #6007" available from Mitsubishi Gas Chemical Company, Inc.) and cobalt stearate in a weight ratio of 99.5/0.5 was melt-kneaded in a twin-screw extruder at a cylinder temperature of 270° C., extruded into strands through an extruder head, cooled and pelletized. In the same manner as in Example 2 except for using the obtained pellets as the polyamide resin C, a three-layer container was produced. The results of evaluation of the three-layer container for the oxygen permeability and the delamination are shown in Table 2.

Comparative Example 2

The oxygen permeability of the three-layer container obtained in Comparative Example 1 was measured. The results are shown in Table 2.

EXAMPLE 6

A three-layer container was produced in the same manner as in Example 1 except for adding 0.2 part by weight of sodium montanate ("Hostamont NaV101" tradename of Clariant (Japan) K.K.) as a blush inhibitor per 100 parts by weight of the total of the polyamide resins during the mixing operation of the polyamide resin C and the polyamide resin D, and changing the shape of the container as shown below.
Shape of Multilayer Container
170 mm overall length, 330 ml capacity, 25 mm neck diameter, 66 mm barrel diameter
(polyamide)polyester resin A/mixed resin B/(polyamide) polyester resin A=0.33 mm/0.066 mm/0.12 mm
bottom shape: champagne bottle shape
The results of evaluation of the three-layer container for the delamination and the haze are shown in Table 3. The haze was evaluated on the intermediate layer taken from the low stretch portion (1 to 1.5 times of stretch ratio) of the three-layer container which was stored at 40° C./80%RH for 6 months after filled with 330 ml of water.

EXAMPLE 7

In the same manner as in Example 6 except for using ethylenediamine ("Alflow H-50T" tradename of NOF Corporation) as the blush inhibitor, a three-layer container was produced. The evaluation results taken in the same manner as in Example 6 are shown in Table 3.

Comparative Example 3

In the same manner as in Example 6 except for constituting the intermediate layer only from the polyamide resin C without using the polyamide resin D, a three-layer container was produced. The evaluation results taken in the same manner as in Example 6 are shown in Table 3.

TABLE 3

|  | Examples | | Com. Ex. |
| --- | --- | --- | --- |
|  | 6 | 7 | 3 |
| Resin |  |  |  |
| polyester resin A | PET* | PET* | PET* |
| polyamide resin C | MXD6* | MXD6* | MXD6* |
| polyamide resin D | 6IT* | 6IT* | — |
| mixed resin B* (weight ratio) | 90/10 | 90/10 | 100/0 |
| blush inhibitor | 1* | 2* | — |
| Solubility index |  |  |  |
| Sa | 11.1 | 11.1 | 11.1 |
| Sc | 13.0 | 13.0 | 13.0 |
| Sd | 12.6 | 12.6 | — |
| Falling test |  |  |  |
| number of containers tested | 50 | 50 | 50 |
| number of delaminated containers | 4 | 4 | 13 |
| delamination rate (%) | 8 | 8 | 26 |
| Haze (%) |  |  |  |
| before storage | 1.5 | 1.5 | 1.4 |
| after storage | 13.0 | 11.5 | 45.5 |

Mixed resin B*: polyamide resin C/polyamide resin D
PET*: polyethylene terephthalate
MXD6*: polyamide MXD6
6IT*: nylon 6IT
1*: sodium montanate
2*: ethylenediamine As described above, according to the present invention, there is obtained a multilayer container that is resistant to delamination and exhibits an excellent gas barrier property. Therefore, the present invention is of a great industrial value.

What is claimed is:

1. A multilayer container comprising an outermost layer, an innermost layer and at least one intermediate layer interposed between the outermost layer and the innermost layer, wherein the outermost layer and the innermost layer are each mainly made of a thermoplastic polyester resin A produced by polymerizing a dicarboxylic acid component comprising 80 mol % or higher of terephthalic acid with a diol component comprising 80 mol % or higher of ethylene glycol;

at least one of the at least one intermediate layer is mainly made of a mixed resin B of a polyamide resin C and a polyamide resin D, said polyamide resin C and said polyamide resin D being in the mixed resin B in amounts in a range of 99.5 to 80 parts by weight of polyamide resin C and in a range of 0.5 to 20 parts by weight of polyamide resin D, for every 100 parts by weight of a total of polyamide resin C and polyamide resin D in the mixed resin B;

the mixed resin B further containing cobalt in an amount of 0.01 to 0.1% by weight based on a total weight of the polyamide resin C and the polyamide resin D;

the polyamide resin C being produced by polymerizing a diamine component comprising 70 mol % or higher of m-xylylenediamine with a dicarboxylic acid component comprising 70 mol % or higher of adipic acid;

the polyamide resin D having a solubility index satisfying the formula (1):

$$Sa<Sd<Sc \qquad (1)$$

wherein Sa is a solubility index of the thermoplastic polyester resin A; Sc is a solubility index of the polyamide resin C, and Sd is a solubility index of the polyamide resin D, each solubility index being calculated by Small method; and the polyamide resin D having a glass transition temperature of 130° C. or lower which is higher than that of the polyamide resin C.

2. The multilayer container according to claim 1, wherein the polyamide resin C is a solid phase-polymerized polyamide resin produced by a solid phase polymerization of a polyamide resin which is produced by melt-polycondensing the diamine component comprising 70 mol % or higher of m-xylylenediamine and the dicarboxylic acid component comprising 70 mol % or higher of adipic acid.

3. The multilayer container according to claim 1, wherein Sd is 11 to 13.

4. The multilayer container according to claim 1, wherein the polyamide resin D contains a constitutional unit derived from an aromatic dicarboxylic acid.

5. The multilayer container according to claim 4, wherein the aromatic dicarboxylic acid is terephthalic acid and/or isophthalic acid.

6. The multilayer container according to claim 1, wherein the mixed resin B further contains a phyllosilicate treated with an organic swelling agent in an amount of 0.5 to 8% by weight based on a total weight of the polyamide resin C and the polyamide resin D.

7. The multilayer container according to claim 1, wherein the mixed resin B further contains a blush inhibitor in an amount of 0.005 to 1.0 part by weight based on 100 parts by weight of a total weight of the polyamide resin C and the polyamide resin D.

8. The multilayer container according to claim 7, wherein the blush inhibitor is at least one compound selected from the group consisting of metal salts of $C_{18}$ to $C_{50}$ aliphatic acid.

9. The multilayer container according to claim 7, wherein the blush inhibitor is at least one compound selected from the group consisting of diamide compounds produced from a $C_8$ to $C_{30}$ aliphatic acid and a $C_2$ to $C_{10}$ diamine, and diester compounds produced from a $C_8$ to $C_{30}$ aliphatic acid and a $C_2$ to $C_{10}$ diol.

10. The multilayer container according to claim 1, wherein the mixed resin B is contained in an amount of 1 to 20% by weight based on a total weight of the multilayer container.

11. The multilayer container according to claim 3, wherein Sd is 12.0 to 12.9.

12. The multilayer container according to claim 1, wherein said amounts of polyamide resin C and polyamide resin D in the mixed resin B are in a range of 99 to 85 parts by weight of polyamide resin C and in a range of 1 to 15 parts by weight of polyamide resin D, for every 100 parts by weight of the total of polyamide resin C and polyamide resin D in the mixed resin B.

13. The multilayer container according to claim 12, wherein said amounts of polyamide resin C and polyamide resin D in the mixed resin B are in a range of 95 to 90 parts by weight of polyamide resin C and in a range of 5 to 10 parts by weight of polyamide resin D, for every 100 parts by weight of the total of polyamide resin C and polyamide resin D in the mixed resin B.

14. The multilayer container according to claim 1, wherein said cobalt is incorporated in said polyamide resin C and said polyamide resin D as an inorganic salt, an organic salt or a complex salt of its lower oxidation number.

15. The multilayer container according to claim 14, wherein said cobalt is incorporated in said polyamide resin C and said polyamide resin D as an inorganic salt or a complex salt of its lower oxidation number.

16. The multilayer container according to claim 14, wherein said organic salt is selected from the group consisting of sulfonates and phosphates.

17. The multilayer container according to claim 1, wherein said cobalt is contained in the mixed resin B in an amount of 0.02 to 0.08% by weight based on the total weight of the polyamide resin C and the polyamide resin D.

\* \* \* \* \*